Sept. 21, 1926.
R. R. MOORE
AIRPLANE GLIDER
Filed July 11, 1925
1,600,838
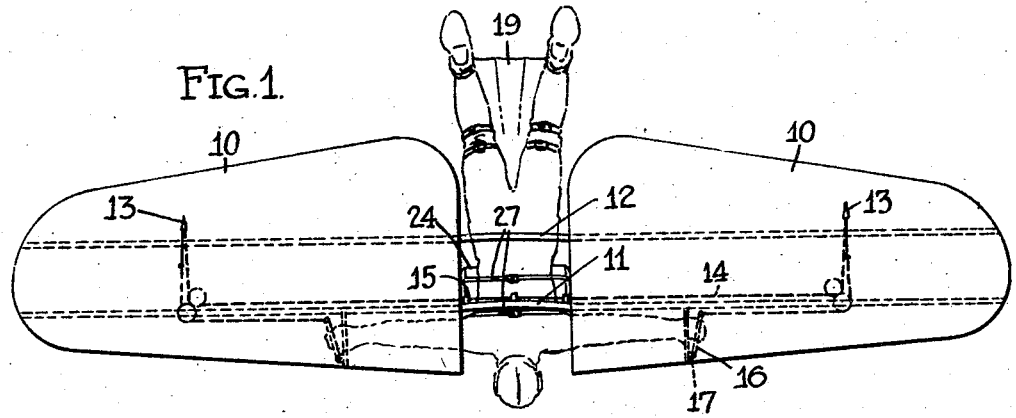
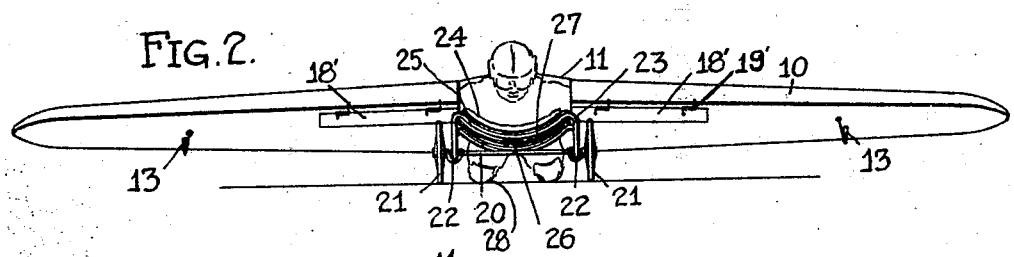
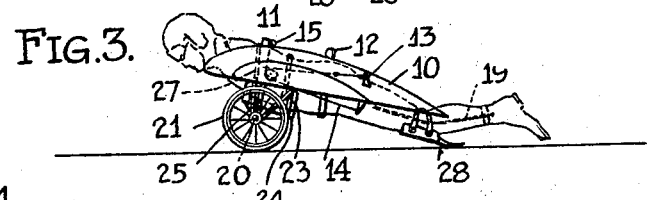
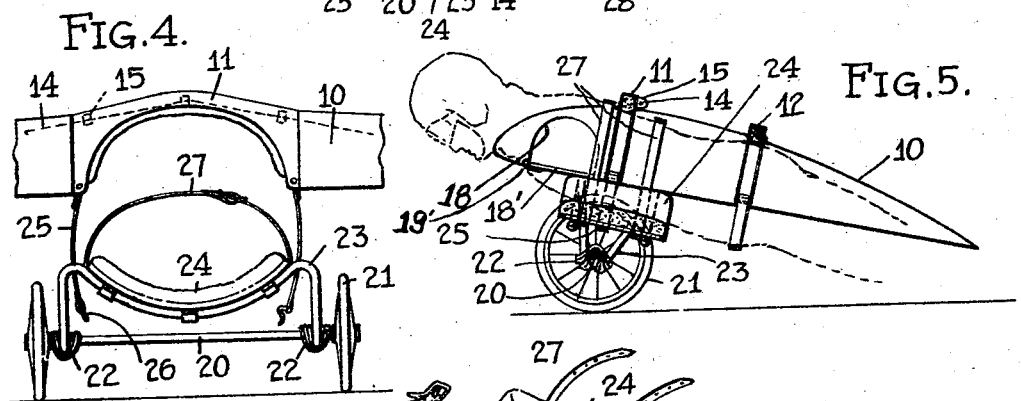
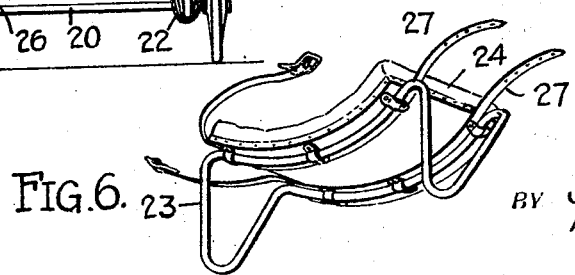
INVENTOR
RAY R. MOORE.
BY
ATTORNEY Patented Sept. 21, 1926.

1,600,838

UNITED STATES PATENT OFFICE.

RAY R. MOORE, OF HEMPSTEAD, NEW YORK.

AIRPLANE GLIDER.

Application filed July 11, 1925. Serial No. 42,874.

My invention relates to airplanes and is more particularly concerned with airplane gliders.

An object of the invention is to provide an airplane glider in which the person of the operator is directly supported upon a landing gear detachably fastened to the wings or supporting surface of the machine. A glider thus characterized is especially adapted to exhibition flying. It is also useful as a training machine. A student or inexperienced operator can, without danger, quickly learn the fundamentals of manually controlled free flight. An instructor is unnecessary.

If used for training purposes, the glider is preferably towed at sufficient speed to cause it to rise in the air to a height of several feet (possibly three or four feet). At this height as much practice in preserving or maintaining lateral balance as may be necessary can be readily had. Should the the glider for any cause become uncontrollable and a crash imminent during the instruction period, the operator can, by quickly releasing the landing gear connection, shed the wings clear of the machine. Thus separated, the operator, still lying upon and supported by the landing gear, will fall freely and without danger of injury to either himself or to the landing gear. The wing structure, stripped of the weight of the operator and of the landing gear, will also fall; slowly however, and likewise without serious injury due to its exceedingly light weight and large area.

As an exhibition machine the glider can, if towed by a power driven airplane, soar to a considerable height, i. e., several thousand feet. At such elevation the operator can, if safety precautions are arranged in advance, release the landing gear upon which he is directly supported, and thru the use of a parachute, slowly fall again to the earth without injury. Such a machine, operated as suggested, would exercise a great public appeal and would, if used for exhibition work, and upon the sudden release of its wings, greatly surprise and thrill an audience wholly ignorant of the safety feature provided.

A further characteristic of the invention is the provision of openings or channels in each wing and into which the arms of the person of the operator are adapted to extend. The wings of the machine are preferably laterally spaced to accommodate the operator in the open space between them. At or near the outer end of each opening or channel suitable control mechanism is installed. The operator, by extending his arms outwardly, one into each of the openings or channels, can, by grasping the controls conveniently manipulate the control surface or surfaces with which the glider is equipped. Moreover, by constructing such openings in the form of downwardly opening channels no obstruction whatsoever is offered to the quick release of the wings.

Other objects of the invention such as the provision of knee skids, the novel construction of the landing gear, the wing arrangement and interconnection, etc., will be hereinafter more fully explained.

In the drawings, wherein like reference characters denote like or corresponding parts, Fig. 1 is a plan view of the glider showing the posture of the person of the operator in flight;

Fig. 2 is a front end elevation;

Fig. 3 is a side elevation;

Fig. 4 is a front elevation of the center section of the supporting surface with the landing gear detached;

Fig. 5 is a central longitudinal sectional view, and

Fig. 6 is a perspective view of that portion of the landing gear providing a support for the body of the person of the operator.

In the embodiment of the invention selected for illustration a monoplane type glider is shown. It preferably consists of a single supporting surface comprising laterally spaced relatively fixed airplane wings 10—10. The spacing of the wings is such that the person of the operator may be accommodated in the open free space between said wings. As a connection between the wings 10—10 two upwardly arched connections 11—12 are provided. Both arched connections are preferably of channel section and are constructed of a light strong metal such as duralumin. Within the open ends of each connection the wing beams, indicated by dotted lines in Fig. 1, are extended. Thus joined, a rigid connection between the opposed wings is provided.

Lateral balance, in flight, is obtained by warping the outer rear margins of the wings 10—10. If desired, ailerons may be used instead. Each wing, at or near its outer rear margin, is provided with oppositely extending control arms 13. The downwardly extending control arms are directly interconnected thru a flexible control cable 14 carried across the open space in suitable guides 15 fastened to the cross-connection 11 joining the forward wing beams of the wings 10—10. The upwardly extending control arms 13, instead of being directly interconnected, are each separately connected with suitable control levers 16 pivoted at 17 to the framework of the wing, one of said levers 16 being provided for each wing. The operator, by grasping said control levers 16, one in each hand, can, thru a proper manipulation thereof, oppositely warp the outer rear ends of the wings 10—10.

It will be observed (Fig. 1) that the control levers 16 are spaced outwardly some little distance beyond the inner ends of the wings. Each wing, on its underside, and leading outwardly from its inner end, has formed therein a suitable opening or channel 18. Said openings or channels 18 open downwardly throughout their full length, and as each is positioned adjacent to the leading edge of the wing within which it is formed, obviously said channels are adapted to receive the arms of the person of the operator when outstretched as indicated in Fig. 1. If desired, each channel 18 may have associated with it a hinged flap 18' which is yieldingly held closed by springs 19' (see Fig. 2). Upon shedding the wings 10—10 the downward pressure exerted on the flaps 18' is sufficient to swing them open to thus expose the channels and permit the unobstructed withdrawal of the operator's arms.

The person of the operator in the operation of the glider is confined to the open space between the laterally separated wings. Preferably such operator assumes, in operation, a lying posture, head foremost, with the legs spread and extending rearwardly well beyond the trailing edge of the supporting surface. To assist in directional control, the legs of the operator may be provided with a fan-shaped control surface 19 movable either upwardly or downwardly as desired, by bending the legs at the knees.

Beneath the open space between the wings 10—10 the landing gear of the glider is fastened. Such landing gear includes an axle 20, wheels 21, appropriate shock absorbers 22 and a supporting framework 23. The latter, the framework 23, is fastened to the axle 20 as indicated. Intermediately of its ends it is extended beneath the forward wing connection 11, being preferably arched downwardly as indicated in Fig. 4. Said support 23, in conjunction with the cross-connection 11, provides an encircling framework for the body of the person of the operator. In the interest of comfort, said support 23 may be cushioned as at 24.

During flight, the landing gear in its entirety, including the support 23 upon which the person of the operator is adapted to lie, is detachably fastened to the wings 10—10 of the machine, straps 25 having snap buckles 26, being provided for this purpose. Preferably the straps 25 are fastened to the wing connections 11 and 12, the forward strap being extended beneath the landing gear and the rear strap beneath the operator's body. There is also provided, as a means for holding the operator in place upon the landing gear, suitable straps 27. These straps may or may not be provided with snap buckles. Moreover, for the protection of the operators legs, knee skids 28, having no connection whatsoever with the supporting surface, are provided.

As hereinabove stated, an airplane glider of the type set forth is useful both as a training machine and as an exhibition glider. When used as a training machine, it is intended that it shall be towed at a rate of speed which will cause it (the glider) to rise into the air only three or four feet above the ground. So long as the speed remains sufficient to cause the machine to glide or soar, the operator, thru the manipulation of the controls, may practice maintaining lateral balance. So long as flight is maintained under perfect control, the wings and landing gear remain intact. Should the operator, however, loose control and a crash become imminent, the landing gear, by simultaneously releasing the snap buckles 26, together with the person of the operator, may be separated from the wings, in which event, a fall of three or four feet to the ground vertically, will not prove serious. In other words, by shedding the wings, other than a free vertical fall is impossible.

Used as a exhibition machine, an experienced operator can control the flight of the glider, if towed at sufficient speed, until it, the glider, has obtained the height of several thousand feet. At this altitude the wings may again be shed, and since it is intended that the operator under these conditions shall be provided with a parachute, obviously a slow fall to the earth, minus the wings, may be accomplished.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. An airplane glider comprising relatively fixed laterally spaced airplane wings adapted to receive in the open space between them, the person of the operator; a rigid connection between said wings extended across said open space and providing a back-support against which the back of the person of the operator is adapted to bear, and a freely shedable underneath support for the person of the operator likewise extended across said open space, said back-support and said underneath support jointly providing an encircling frame within which the person of the operator is adapted to be held.

2. An airplane glider comprising relatively fixed laterally spaced airplane wings adapted to receive in the open space between them, the person of the operator; a rigid connection between said wings extended across said open space and providing a back-support against which the back of the person of the operator is adapted to bear, and a freely shedable underneath support for the person of the operator likewise extended across said open space, said back-support and said underneath support being oppositely arched to jointly provide a horizontally divided body encircling framework within which the person of the operator is adapted to be held.

3. An airplane glider comprising laterally spaced airplane wings adapted to receive in the open space between them, the person of the operator, said wings, at their inner ends, having formed therein, oppositely extended openings into which the arms of the operator may extend; and control mechanism operable from points in the vicinity of the outer ends of said openings.

4. An airplane glider comprising laterally spaced airplane wings adapted to receive in the open space between them, the body of the person of the operator, said wings, at their inner ends, having formed therein, oppositely extending downwardly opening channels within which the arms of the operator are free to extend; and control mechanism operable from points in the vicinity of the outer ends of said channels.

5. An airplane glider comprising relatively fixed laterally spaced airplane wings adapted to receive in the open space between them, the body of the person of the operator, a support for the body of the person of the operator detachably fastened to said wings beneath said open space, and means operable to break the fastening between said support and said wings whereby the latter are shed clear of the support.

6. An airplane glider comprising laterally spaced airplane wings adapted to receive in the open space between them, the body of the person of the operator, a support for the body of the person of the operator detachably fastened to said wings directly beneath said open space, and yieldingly held landing devices mounted, one at each side of said support.

7. In an airplane glider, a supporting surface, and a landing gear upon which the person of the operator is adapted to lie, said landing gear comprising a forward portion detachably connected to said supporting surface and a rear portion wholly carried by the person of the operator.

8. An airplane glider comprising laterally spaced airplane wings adapted to receive in the open space between them, the person of the operator, a rigid connection between said wings arched across said open space, said connection providing a back-support against which the back of the person of the operator is adapted to bear, and a landing gear detachably connected to said wings beneath said open space and upon which the person of the operator is adapted to lie, said landing gear and said arched connection jointly providing an encircling framework within which the person of the operator is adapted to be releasably held.

In testimony whereof I hereunto affix my signature.

RAY R. MOORE.